(12) United States Patent
Burgoon et al.

(10) Patent No.: US 10,001,187 B2
(45) Date of Patent: Jun. 19, 2018

(54) BRAKE CALIPER WITH BRAKE PAD TIMING AND RETRACTION CONTROLLER

(71) Applicant: Performance Friction Corporation, Clover, SC (US)

(72) Inventors: Donald L. Burgoon, Charlotte, NC (US); Peter N. Babbage, Oxfordshire (GB); Nihal Murthy, Charlotte, NC (US); Darin E. Cate, York, SC (US)

(73) Assignee: PERFORMANCE FRICTION CORPORATION, Clover, SC (US)

( * ) Notice: Subject to any disclaimer, the term of this patent is extended or adjusted under 35 U.S.C. 154(b) by 0 days. days.

(21) Appl. No.: 15/370,984

(22) Filed: Dec. 6, 2016

(65) Prior Publication Data

US 2017/0082162 A1    Mar. 23, 2017

Related U.S. Application Data

(63) Continuation of application No. 12/755,782, filed on Apr. 7, 2010, now Pat. No. 9,512,892.
(Continued)

(51) Int. Cl.
*F16D 65/54* (2006.01)
*F16D 65/18* (2006.01)
(Continued)

(52) U.S. Cl.
CPC ............ *F16D 65/54* (2013.01); *F16D 65/18* (2013.01); *F16D 2121/02* (2013.01); *F16D 2125/582* (2013.01); *F16D 2127/02* (2013.01)

(58) Field of Classification Search
CPC ....... F16D 65/54; F16D 65/18; F16D 2121/02
(Continued)

(56) References Cited

U.S. PATENT DOCUMENTS

| 2,536,269 | A | | 1/1951 | Driscoll |
| 2,551,251 | A | * | 5/1951 | Du Bois ................. F16D 65/54 |
| | | | | 188/71.8 |

(Continued)

FOREIGN PATENT DOCUMENTS

| CA | 2716423 A1 | 4/2011 |
| CN | 1239538 A | 12/1999 |

(Continued)

OTHER PUBLICATIONS

European Search Report issued in European Patent Application No. 10164195, dated Aug. 19, 2010.
(Continued)

*Primary Examiner* — Thomas W Irvin
(74) *Attorney, Agent, or Firm* — Roberts Mlotkowski Safran Cole & Calderon, P.C.

(57) ABSTRACT

A brake caliper is provided with a timing and retraction controller that that adjusts brake timing, eliminates parasitic brake losses and dampens out-of-plane vibration between the brake pad and rotor. The brake caliper includes a housing disposed over a brake rotor; first and second opposing brake pads extendably and retractably mounted on opposite sides of the caliper housing, brake pistons that extend and retract the brake pads into and out of frictional engagement with the rotor, and brake pad timing and retraction controllers disposed on opposite sides of the caliper housing. Each controller includes a Belleville spring or other resilient member with a short compression travel limited to between about 1.50 mm and 0.025 mm. The short stroke Belleville spring of each controller applies a hold-off force against the extension force of the brake pistons that slightly delays brake pad extension and slightly reduces brake pad clamping force against the rotor, thereby advantageously providing a front wheel braking bias when applied to the rear wheels of a vehicle. The restorative force applied by the short stroke
(Continued)

Belleville forcefully and uniformly retracts the brake pad from the rotor, eliminating parasitic brake losses, and dampening out-of-plane vibration between the brake pad and rotor.

29 Claims, 7 Drawing Sheets

Related U.S. Application Data (60) Provisional application No. 61/255,024, filed on Oct. 26, 2009.

(51) Int. Cl.
*F16D 121/02* (2012.01)
*F16D 127/02* (2012.01)
*F16D 125/58* (2012.01)

(58) Field of Classification Search
USPC ... 188/72.3, 73.36, 73.38, 71.7, 71.8, 196 R, 188/196 P, 73.46, 73.47, 349
See application file for complete search history.

(56) References Cited

U.S. PATENT DOCUMENTS

| | | | | |
|---|---|---|---|---|
| 2,830,680 A * | 4/1958 | Hawley | ............... | F16D 65/54 188/152 |
| 2,997,138 A * | 8/1961 | Cagle | ............... | F16D 55/32 188/196 P |
| 3,243,017 A * | 3/1966 | Kleinstuck | ............... | F16D 55/228 188/196 P |
| 3,403,755 A * | 10/1968 | Barrett | ............... | F16D 65/543 188/196 P |
| 3,532,190 A * | 10/1970 | Palmer | ............... | F16D 25/0638 188/196 P |
| 3,554,334 A * | 1/1971 | Shimano | ............... | B62L 3/023 188/24.16 |
| 3,613,849 A * | 10/1971 | Pape | ............... | F16D 13/757 188/196 P |
| 3,618,714 A * | 11/1971 | Croswell | ............... | F16D 65/54 188/196 P |
| 3,730,306 A * | 5/1973 | Rath | ............... | F16D 55/22 188/345 |
| 4,042,072 A * | 8/1977 | Baba | ............... | F16D 65/18 188/196 P |
| 4,050,548 A * | 9/1977 | Margetts | ............... | F16D 65/54 188/196 P |
| 4,057,127 A * | 11/1977 | Woodring | ............... | B62L 3/08 188/2 D |
| 4,345,674 A * | 8/1982 | Vacval | ............... | F16D 65/18 188/196 P |
| 4,378,863 A * | 4/1983 | Baum | ............... | F16D 65/567 188/196 D |
| 4,382,491 A * | 5/1983 | Chun | ............... | F16D 55/22655 188/196 P |
| 4,662,483 A * | 5/1987 | Boeck | ............... | F16D 55/226 188/72.3 |
| 4,712,654 A * | 12/1987 | Temple | ............... | F16D 65/18 188/196 P |
| 4,993,532 A * | 2/1991 | Weiss | ............... | F16D 13/75 188/196 P |
| 5,186,284 A * | 2/1993 | Lamela | ............... | F16D 55/36 188/1.11 R |
| 5,427,211 A * | 6/1995 | Sulzer | ............... | F16D 55/40 188/196 P |
| 5,549,181 A * | 8/1996 | Evans | ............... | F16D 65/097 188/216 |
| 6,305,506 B1 * | 10/2001 | Shirai | ............... | B60T 7/042 188/136 |
| 6,378,665 B1 * | 4/2002 | McCormick | ............... | F16D 65/0975 188/72.3 |
| 6,394,236 B1 * | 5/2002 | Matsuishita | ............... | B62L 1/00 188/24.22 |
| 6,397,983 B1 * | 6/2002 | Roszman | ............... | F16D 55/227 188/71.8 |
| 6,766,886 B2 * | 7/2004 | Bendtsen | ............... | F16D 65/18 188/196 P |
| 8,037,979 B2 * | 10/2011 | Strandberg | ............... | F16D 65/54 188/196 P |
| 2004/0195056 A1 | 10/2004 | Ashman et al. | | |
| 2009/0071765 A1 * | 3/2009 | Strandberg | ............... | F16D 65/54 188/71.8 |
| 2011/0094834 A1 | 4/2011 | Burgoon et al. | | |
| 2011/0266099 A1 | 11/2011 | Knowles, Jr. | | |

FOREIGN PATENT DOCUMENTS

| | | |
|---|---|---|
| CN | 1314284 A | 9/2001 |
| CN | 102230506 A | 11/2011 |
| DE | 4304616 A1 | 8/1994 |
| EP | 2314895 A1 | 4/2011 |
| GB | 840392 A | 7/1960 |
| GB | 1495701 A | 12/1977 |
| GB | 1600998 A | 10/1981 |
| JP | S4729078 U | 12/1972 |
| JP | S4733584 U | 12/1972 |
| JP | S4825490 B1 | 7/1973 |
| JP | S51-21786 U | 5/1974 |
| JP | S5089767 A | 7/1975 |
| JP | S5656941 U | 5/1981 |
| JP | S56148128 U | 11/1981 |
| JP | S5744230 U | 3/1982 |
| JP | S5757932 A | 4/1982 |
| JP | S64-35226 U | 3/1989 |
| JP | H101178241 U | 12/1989 |
| JP | H10669460 U | 9/1994 |
| JP | 2000088014 A | 3/2000 |
| JP | 2011122717 A | 6/2011 |
| KR | 1020050120468 A | 12/2005 |

OTHER PUBLICATIONS

International Search Report & Written Opinion issued in PCT/US2016/061309, dated Feb. 17, 2017.

* cited by examiner

BRAKE CALIPER WITH BRAKE PAD TIMING AND RETRACTION CONTROLLER

RELATED APPLICATIONS

This patent application is a continuation of co-pending Ser. No. 12/755,782, filed on Apr. 7, 2010, which claims the priority of U.S. Provisional Application No. 61/255,024 filed Oct. 26, 2009, the contents of each are hereby incorporated by reference for all that it discloses.

FIELD OF THE INVENTION

This invention generally relates to brake calipers, and is specifically concerned with a brake caliper having a brake pad timing and retraction controller that both adjustably delays and negatively biases brake pad extension force when the brake pedal is depressed and forces positive and uniform retraction of the brake pad when the brake pedal is released.

BACKGROUND OF THE INVENTION

Brake calipers for automotive disc brakes are well known in the prior art. In typical disc brake assemblies, a rotor is mounted on a wheel hub for rotation. One or more pairs of brake pads, generally designed as friction material carried on a backing plate, are supported on either side of the rotor by a caliper or an anchor bracket. Calipers are designed to apply the braking force by moving a piston relative to the rotor to move the brake pad into and out of contact with the rotor. The pistons are supported in a bore in the caliper and abut the backing plate of the brake pad to move the brake pad toward the rotor upon application of a braking force. The pistons are connected to elastomeric seal sleeves which normally withdraw the pistons, and hence the brake pad, into a non-engaging position with respect to the rotor. In operation, when the brake pedal is depressed by the vehicle operator, actuation force is generated hydraulically or mechanically. In a hydraulic system pressure is generated in the master cylinder or by a pump of the brake system, which conducts pressurized hydraulic fluid to the pistons in the caliper. The pressure of the hydraulic fluid against the ends of the pistons overcomes the withdrawing force that the elastomeric seal sleeves apply to the pistons, causing them to extend and to engage the brake pad against the rotor, thereby applying a braking force to the wheels of the vehicle. When the vehicle operator releases the brake pedal, the restorative force applied to the piston by the elastomeric sleeves causes them to withdraw. The brake pads, which are typically not connected to the pistons, then float back from and out of engagement with the rotor. In lieu of pistons, such actuation and withdrawal of the brake may also be accomplished non-hydraulically through a series of levers, cams, and or wedges.

During a braking operation, it is important that the braking forces applied by all four wheels of the vehicle be coordinated in order to maximize not only the braking of the vehicle, but the control of the vehicle during braking. The applicants have observed that maximum control of some vehicles during braking can best be maintained if the front brakes operate slightly before the rear brakes operate. Unfortunately, even though most vehicle braking systems are designed to apply a greater amount of front tire braking force than rear tire braking force, the applicants have observed the structure of most master cylinders and brake calipers tends to actuate the rear brakes slightly ahead of the front brakes. Such operation compromises control of the vehicle during the transition period between the application of primarily back-wheel brake forces and primarily front-wheel brake forces. Moreover, it is also important that the brake pads quickly and positively disengage the rotor throughout the entire surface of the pad when the operator releases the brake pedal. Otherwise, parasitic braking can occur which lowers fuel efficiency and accelerates wear on the brake pads.

SUMMARY OF THE INVENTION

Accordingly, the applicants have observed that there is a need for a brake caliper having a brake pad timing and retraction controller that can easily and reliably adjust the timing and clamping force of the brake pad extension when the brake pedal is depressed, and that can positively and uniformly retract the brake pad from the rotor when the brake pad is released. To this end, the brake caliper of the invention comprises a caliper housing, a brake pad having a braking surface that selectively engages a brake rotor, at least one reacting member such a hydraulic piston mounted in the housing that extends and retracts the brake pad into and out of frictional engagement with said rotor; and a brake pad timing and retraction controller including at least one resilient member with limited compression travel.

The brake pad timing and retraction controller biases against extension by applying an adjustable hold-off force against an extension force applied to said brake pad by said reacting member that momentarily delays extension and slightly reduces the resulting clamping force between the brake pad and the rotor. The controller also forces positive and uniform retraction of the brake pad from the rotor, thereby minimizing parasitic braking. Additionally, the controller positively retracts the brake pad from the rotor a consistent distance throughout the wear life of the brake pad and rotor, rendering the mechanism self-adjusting. The controller also damps out-of-plane vibration between the brake pad and rotor. Advantageously, the use of separate controllers on opposing brake pads in an opposing brake caliper results in the application of independent pull back forces on the pads, thereby insuring that both pads will be positively and uniformly retracted out of engagement with the rotor.

The brake pad timing and retraction controller includes a bolt having a shaft that includes an end prepared for attachment to the brake pad which may be a threaded end. The threaded end is connected to the brake pad, and the shaft is movably mounted with respect to the housing. The controller also includes a caliper retraction collar, which acts as a compression travel limiter frictionally engaged but slidably movable on the bolt shaft arid spaced apart from the threaded end, and the caliper housing includes first and second telescoping bores slightly larger than the bolt shaft and the collar, respectively, for slidably receiving the threaded end and the piston retraction collar. The resilient member is captured between the caliper retraction collar and the annular interface between the first and second counter bores. The frictional engagement between the collar and bolt shaft is sufficient to prevent the collar from sliding on said shaft in response to the spring force of the resilient member when the resilient member is completely compressed. However, the frictional engagement between the collar and bolt shaft is insufficient to prevent the collar from sliding on the shaft in response to the extension force applied to the brake pad by the reacting member. Consequently, the wearing down of the pad will cause the reacting member to incrementally slide the collar along the bolt shaft the same distance as the reduction in thickness of the pad due to wear.

Such a structure advantageously allows the brake caliper to be self-adjusting in response to brake pad wear, thereby maintaining a constant-distance brake stroke throughout the life of the brake pad.

The stroke length of the resilient member is adjustable and may be between about 2.0 mm and 0.025 mm, and is preferably between about 0.30 mm and 0.050 mm. The resilient member is preferably formed from a Belleville spring, although a disc spring, certain types of leaf springs or a sheet of elastomeric material may also be used. The resilient member may include a plurality of Belleville springs. While the stroke length may be adjusted by selecting a stack of Belleville springs with the proper spring properties, it is preferable to adjust the stroke length by varying the profile of the spring-engaging side of the collar. As either end of the collar may be used to engage the spring, and as the cylindrical shape of the collar renders it reversible, the collar has two potentially spring-engaging surfaces. One of these surfaces may be provided with a flat profile to maximize the stroke length of the resilient member, while the other of these surfaces may have (in the case where the resilient element is a Belleville spring) a chamfered, dish-shaped profile that is partially complementary in shape to the resilient element in order to shorten the stroke length of the resilient member. Such a structure advantageously allows the stroke length of the resilient member used in the brake pad timing and retraction controller to be easily varied by reversing the orientation of the collar on the bolt shaft. Alternatively, stroke length may also be controlled by machining a shape into the annular interface that captures the spring which is complementary at least in part to the shape of the spring, or by providing a spacer between the annular interface and the spring.

The brake caliper of the invention may be used in combination with a brake of an automotive vehicle. The spring force of the resilient member is preferably selected to create a momentary delay and a hold-off force against the extension force of the reacting member that results in a slight relative reduction in brake clamping force between the operation of, for example, the rear brakes and the front brakes. Accordingly, the invention may be used to provide front brake bias during the entire braking operation, thereby maximizing control of the vehicle during the braking operation. Such a desired momentary delay and slight reduction in clamping force of the rear brakes verses the front brakes may be accomplished by applying the caliper of the invention to the rear brakes only, but is more preferably accomplished by applying the caliper of the invention to the brakes of both the front and rear wheels, with the spring properties (i.e. travel distance or spring force) of the resilient member being different between the rear brake calipers and the front brake calipers in response to the actuation forces applied by the reacting members. Alternatively, left wheel-right wheel brake timing biases may also be implemented by the invention, which may be useful in certain race car driving applications.

Unexpectedly, the applicants have observed that the restorative force of the resilient member used in the brake pad timing and retraction controller not only advantageously adjusts brake timing, but also substantially increases the effective miles obtained per gallon of fuel and reduces brake wear due to a substantial decrease in parasitic braking. Further unexpectedly, the applicants have observed that the resiliency provided by the resilient member used in the brake pad timing and retraction controller also damps out-of-plane vibration between the brake pad and rotor, thereby reducing brake squeal.

DETAILED DESCRIPTION OF THE PREFERRED EMBODIMENT

Figure 1A:
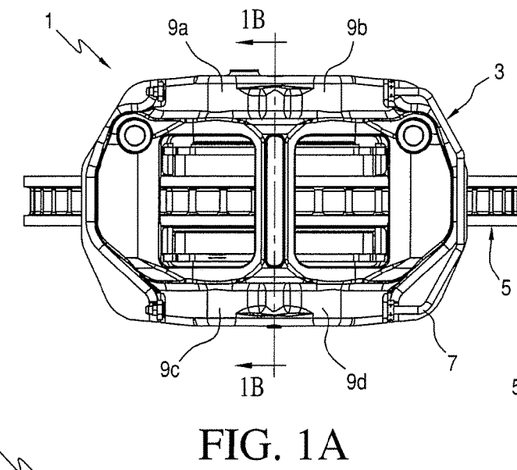
FIG. 1A is a plan view of the inventive brake caliper in combination with a rotor.
Figures 1B, 3B:
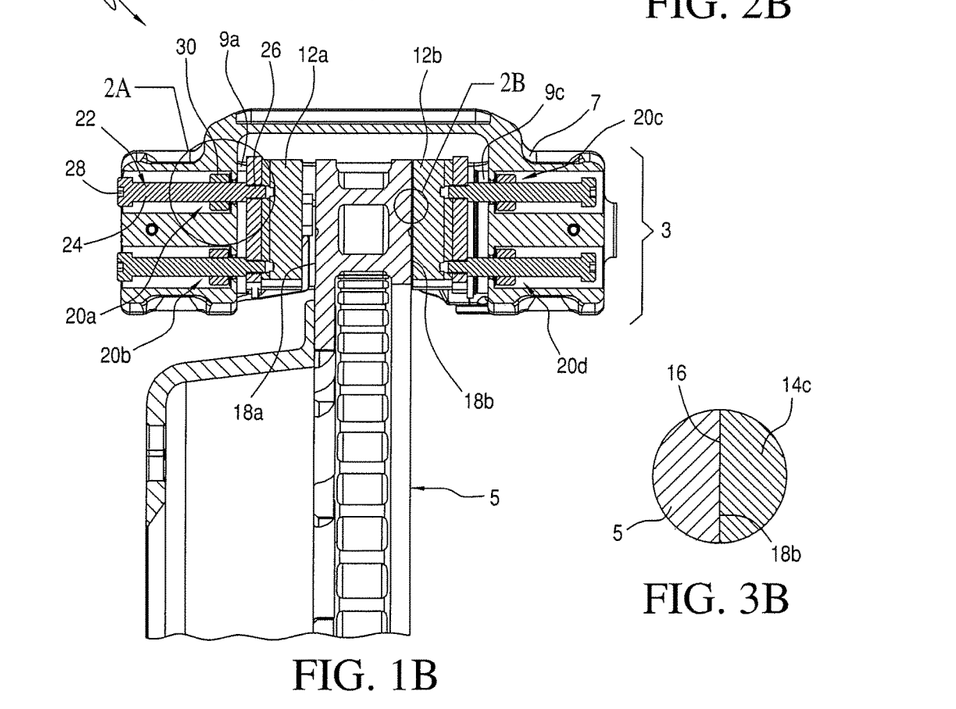
FIG. 1B is a side, cross-sectional view of the caliper and rotor illustrated in FIG. 1A along the line 1B-1B.
FIG. 3B is an enlargement of the circled area in FIG. 1B labeled "2B", illustrating the brake pad and rotor in an engaged state corresponding to an actuated state of the brake pad timing and retraction controller.

FIGS. 1A and 1B illustrate a brake assembly 1 including the brake caliper 3 of the invention in combination with a rotor 5 attached to a wheel hub (not shown) which may be the wheel hub of an automotive vehicle. In this example of the invention, brake caliper 3 includes a housing 7 in which two pairs of opposing hydraulic caliper pistons 9a, 9b and 9c, 9d are slidably mounted within cylinders (not shown). Opposing brake pads 12a, 12b each include a backing plate 14a, and an underlayer 14b that secures a layer of pad material 14c to the backing plate 14a. Opposing brake pads 12a, 12b are mounted on the ends of the opposing caliper pistons 9a, 9b via the backing plate 14a. The brake pads 12a, 12b each have an engagement surface 16 which is adjacent to and engageable with one of the flat, opposing annular engagement surfaces 18a, 18b of the rotor 5 as is best shown in FIG. 1B. It should be noted that hydraulic pistons 9a, 9b and 9c, 9d are only one example of reacting members which may be used to extend and retract the brake pads 12a, 12b with respect to the rotor 5. Alternatively, the pads 12a, 12b may be extended and retracted by an air actuated piston, by a mechanical arrangement of cams and levers, or electrically via solenoids for example. The term "reacting member," as used herein, is intended to include all such mechanism and their equivalents and is not limited to the disclosed examples.

Figure 2A:
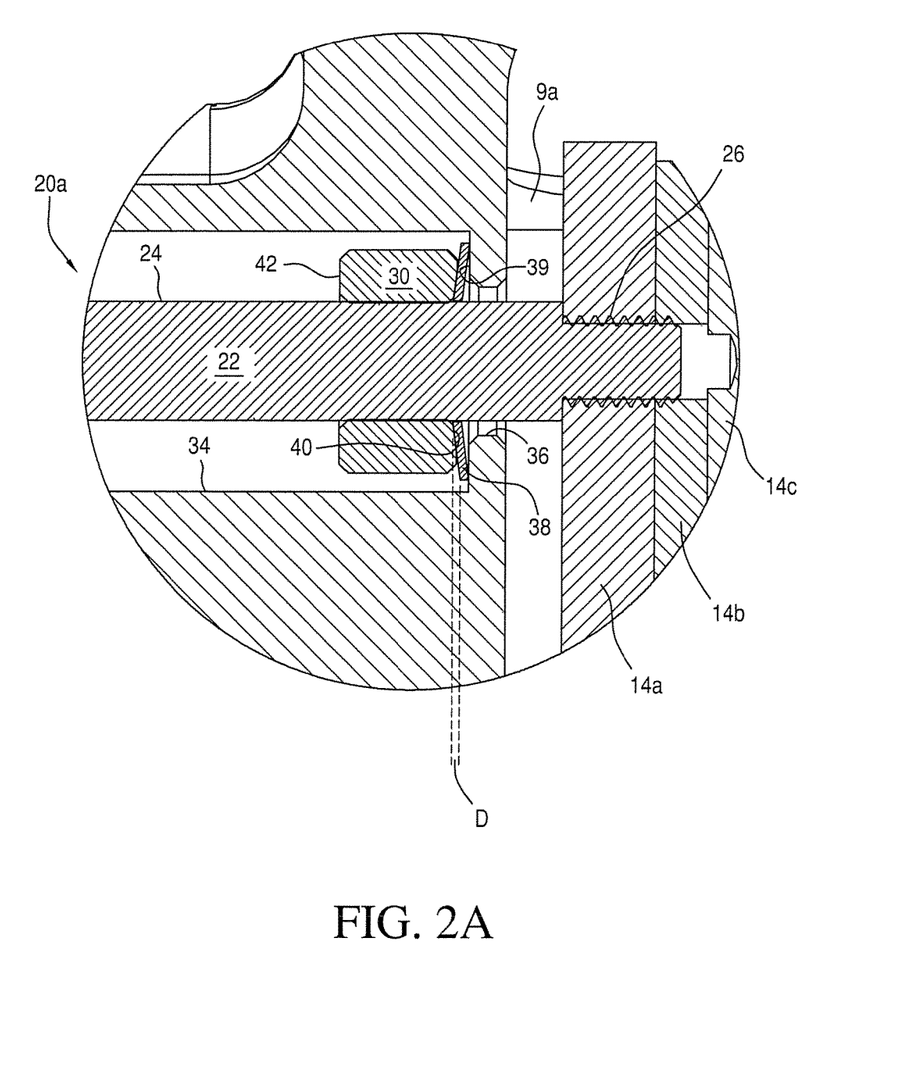
FIG. 2A is an enlargement of the of the circled area in FIG. 1B labeled "2A", illustrating the principal components of the brake pad timing and retraction controller incorporated within the caliper of the invention in an unactuated state.

With reference now to FIGS. 1B and 2A, the housing 7 includes two pairs of opposing brake pad timing and retraction controllers 20a, 20b and 20c, 20d, respectively. Each pair of these brake pad timing and retraction controllers 20a, 20b and 20c, 20d is located to reduce any off center moment of force that may arise from the extension and retraction forces applied to the brake pads 12a, 12b by the pistons 9a, 9b and 9c, 9d and the resilient members in the controllers 20a, 20b and 20c, 20d. To this end, the controllers 20a, 20b and 20c, 20d may be aligned along a central vertical axis of the caliper housing 7 between the pairs of pistons 9a, 9b and 9c, 9d located on either side of the housing 7, as indicated in FIG. 1B. More generally, each pair of brake pad timing and retraction controllers 20a, 20b and 20c, 20d is disposed symmetrically with respect to a centroid of the resultant extension forces applied to the braking pads 12a 12b by the hydraulic caliper pistons 9a, 9b and 9c, 9d. Such positioning of the brake pad timing and retraction controllers 20a, 20b and 20c, 20d reduces or eliminates undesirable off-center moments of force that can tilt the engagement surface 16 of the brake pads 12a, 12b out-of-plane during operation. Serendipitously, the applicants have further observed that the aforementioned, out-of-plane forces may be eliminated by more than one such positioning or arrangement of the brake pad timing and retraction controllers 20a, 20b and 20c, 20d, and that at least one of these force-eliminating arrangements will also correspond to areas of maximum vibration displacement of the brake pads 12a, b. Hence it is possible to selectively position the brake pad timing and retraction controllers 20a, 20b and 20c, 20d in an arrangement that will simultaneously function to eliminate out-of-plane forces and unwanted, noise-generating vibration.

Each of the brake pad timing and retraction controller 20a, 20b and 20c, 20d includes a bolt 22, a caliper retraction collar 30, and a spring member 38 having limited compression travel. Each of these components will now be discussed in detail.

The bolt 22 (best seen in FIG. 5A) includes a cylindrical bolt shaft 24 as shown. Opposing ends of the shaft 24 include a threaded end 26 and a bolt head 28, respectively. The threaded end 26 of each bolt 22 is screwed into a threaded bore present in the backing plate 14a of its respective brake pad 12a, 12b. A caliper retraction collar 30 is frictionally mounted around the bolt shaft 22 by press-fitting. In this example of the invention, the collar 30 is not completely annular, but includes a slot 32 (shown in FIG. 5A) that facilitates the frictional mounting of the collar 30 to the bolt shaft 22. The inner diameter of the collar 30 is slightly smaller than the outer diameter of the bolt shaft 24 so that the collar 30 frictionally grasps the bolt shaft 24 when slidably forced over the threaded end 26. While the press-fitting of the collar 30 over the bolt shaft 24 may be implemented by heating collar 30 in order to enlarge its inner diameter via thermal expansion prior to sliding the collar 30 over the end of the bolt shaft 24, such an assembly method is generally neither necessary nor preferred. In order for the brake pad timing and retraction controller 20a, 20b and 20c, 20d to operate properly, the frictional grip between the collar 30 and the bolt shaft 24 should always be greater than the amount of force necessary to maximally compress the spring member 38, but never greater than the extension force the pistons 9a, 9b and 9c, 9d apply to the brake pads 12a, 12b in order to implement the self-adjusting aspect of the controllers, which is described in greater detail hereinafter.

The housing 7 includes both a caliper retraction bore 34 which is slightly larger in diameter than the collar 30, and a bolt clearance hole 36 which is slightly larger in diameter than the bolt shaft 24 such that the collar 30 and bolt shaft 24 are slidably accommodated within the bores 34 and 36, respectively. The spring member 38 is captured between the collar 30 and an annular ledge 39 that forms the interface between the bores 34 and 36. In the preferred embodiment, the spring member 38 is a dished washer commonly referred to as a Belleville spring having an inner diameter slightly larger than the outer diameter of the bolt shaft 24, and an outer diameter slightly less than the inner diameter of the caliper retraction bore 34. Although compression travel distances of between about 2.0 mm and 0.025 mm and even greater ranges are within the scope of the invention, the advantages of the invention are better realized with compression travel distances of between about 1.50 mm and 0.050, and are best realized with compression travel distances of between about 0.30 mm and 0.10 mm. While all of the aforementioned ranges of compression travel distances effectively delay the extension and accelerate the retraction of the pair of pistons 9a, 9b or 9c, 9d that the particular brake pad timing and retraction controller is associated with, the shorter travel distance ranges are more compatible with rapid brake responsiveness (i.e. a short brake pedal stroke to engage the brake pads 12a, 12b against the rotor 5).

Figure 2B:
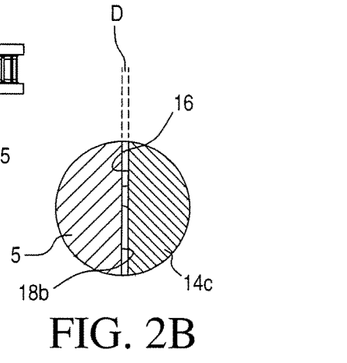
FIG. 2B is an enlargement of the circled area in FIG. 1B labeled "2B", illustrating the brake pad and rotor in a separated state corresponding to an unactuated state of the brake pad timing and retraction controller.
Figure 3A:
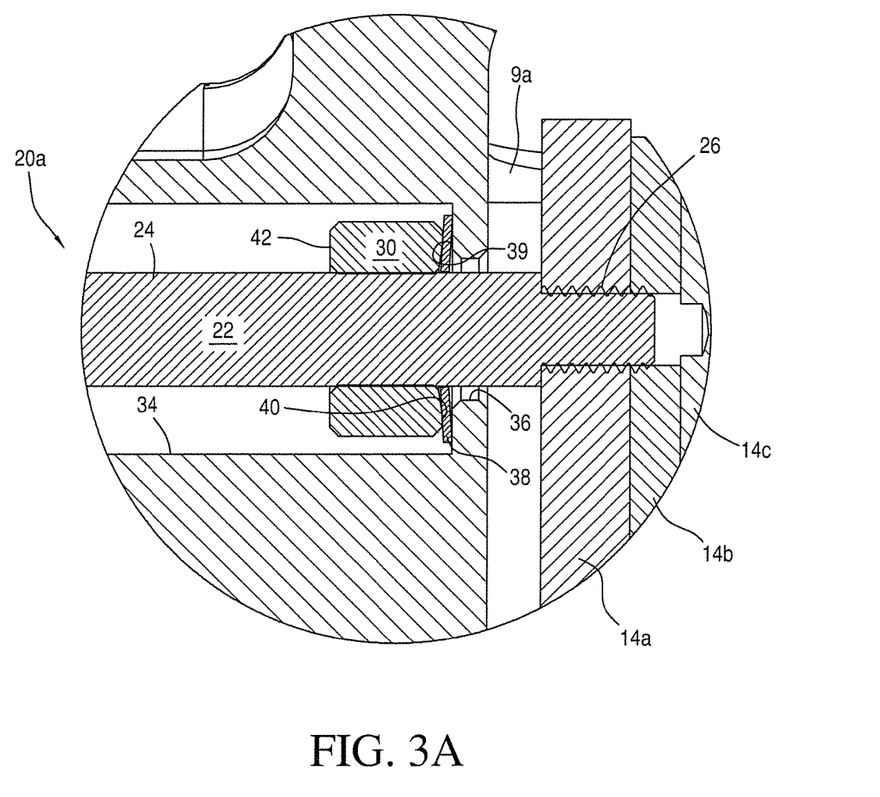
FIG. 3A is an enlargement of the of the circled area in FIG. 1B labeled "2A", illustrating the principal components of the brake pad timing and retraction controller of the invention in an actuated state with an unworn brake pad.

In operation, the spring member 38 is normally in the uncompressed state illustrated in FIG. 2A. In such a state, the brake pads 12a, 12b are out of engagement with the rotor 5, leaving a small pullback distance "D" between these two components visible in FIG. 2B. When the vehicle operator depresses the brake pedal (not shown) of the vehicle, pressurized hydraulic fluid operates against the piston pairs 9a, 9b and 9c, 9d, extending the piston pairs against the spring force applied to them by the Belleville spring forming the spring member 38. As the pistons 9a, 9b and 9c, 9d extend, the bolt shaft 24 (which is connected to the backing plate 14a via threaded end 26) is pulled toward the right-hand side of FIG. 2A. The spring member 38 of each controller resists the extension of the pistons 9a, 9b and 9c, 9d as it is compressed the distance "D" between the collar 30 and the annular ledge 39 from the dished shape illustrated in FIG. 2A into the more flattened shape illustrated in FIG. 3A.

If the brake pad timing and retraction controllers 20a, 20b and 20c, 20d are provided on the rear wheels of a vehicle but not the front wheels, a vehicle that would otherwise have a back wheel braking engagement bias can be advantageously transformed into a vehicle having a front wheel engagement braking bias wherein the front wheels brake slightly sooner than the rear wheels. Such a front wheel braking engagement bias enhances vehicle control during a braking operation. Alternatively, such a front wheel braking engagement bias can be achieved by providing brake pad timing and retraction controller 20a, 20b and 20c, 20d on all four wheels, the difference being that the spring elements 38 used in the rear wheel calipers would be weaker than the spring elements used in the front wheel calipers. Finally, left-right braking wheel biases can be achieved by providing brake pad timing and retraction controller 20a, 20b and 20c, 20d exclusively on either the right or left wheels, or by providing brake pad timing and retraction controller 20a, 20b and 20c, 20d on all four wheels, the difference being that the strength of the spring elements 38 used in the right wheel calipers would be different than the strength of the spring elements 38 used in the left wheel calipers.

In addition to momentarily delaying the extension of the piston pairs 9a, 9b and 9c, 9d, the brake pad timing and retraction controller 20a, 20b and 20c, 20d also advantageously reduce brake pad vibration which can result in reduced braking efficiency as well as undesirable noises. Such vibration is caused by a resonant oscillation of the surface of the brake pads 12a, 12b against the opposing flat, annular surfaces 18a, 18b, of the rotor 5. The spring element 38 in each of the brake pad timing and retraction controller 20a, 20b and 20c, 20d effectively dampens such undesirable vibration by absorbing the energy associated with the resonant oscillations of the brake pads 12a, 12b. The location of the maximum amplitudes of such undesirable vibration may be located via modal analysis. Because the maximum amplitude of such vibration is likely to be centrally located in the brake pads 12a, 12b concentric along the section line 1B-1B illustrated in FIG. 1A, locating each pair of brake pad timing and retraction controller 20a, 20b and 20c, 20d on opposing sides of the section line 1B-1B illustrated in FIG. 1A is likely to enhance the effectiveness of the spring elements 38 in the brake pad timing and retraction controller 20a, 20b and 20c, 20d in damping the unwanted vibrations.

Finally, the applicants have observed that the restorative force applied by the spring members 38 in the brake pad timing and retraction controller 20a, 20b and 20c, 20d are surprisingly effective in reducing parasitic brake losses by more rapidly, positively and uniformly disengaging the brake pads 12a, 12b from the rotor 5 when the brake pedal is released, thereby saving energy and increasing the effective miles obtained per gallon of fuel. As demonstrated by the table below, parasitic brake losses in a diesel-powered vehicle can result in a loss of 215.24 gallons of diesel fuel per year. Assuming a fuel cost of $3.00 per gallon, this translates into a loss of $645 per year which can be substantially if not completely obviated by the incorporation of the previously-described brake pad timing and retraction controller 20a, 20b and 20c, 20d into the brake calipers of the vehicle.

| The Cost Of Brake Drag | | | |
|---|---|---|---|
| Input | Annual Mileage | mi/yr | 50000 |
| | Average Speed | mph | 50 |
| | No. of Dragging Calipers | unitless | 4 |
| | Drag Torque per Caliper w/o Invention | ft*lb | 10 |
| | Rolling Radius | m | 20 |
| | Final Drive Ratio | unitless | 5 |
| | Diesel Fuel Cost | $/gal | $3.00 |
| Assumed | Diesel Engine BSFC | lbm/BHP*hr | 0.4 |
| | Powertrain Efficiency | unitless | 0.85 |
| | Diesel Fuel Density | lbm/gal | 7 |
| Calculated | Tire Rotation Speed | rev/min | 420.38 |
| | Total Brake Drag | BHP | 3.202 |
| | Engine Power Required | BHP | 3.767 |
| | Rate of Fuel Waste | gal/mi | 0.004 |
| | Total Fuel Waste | gal/yr | 215.24 |
| | Total Cost of Fuel Waste | $/yr | $645.72 |

5280 ft/mi
12 in/ft
60 s/min
60 min/hr
hp=ft*lb*rpm/5252
mpg=(fuel density*speed)/(bsfc*bhp)
circumference=6.28*rolling radius $$\text{Rate of Fuel Waste} = \left[\frac{VD}{R_t}\right]\left[\frac{BSFC}{V\rho_f}\right]$$

Figure 4:
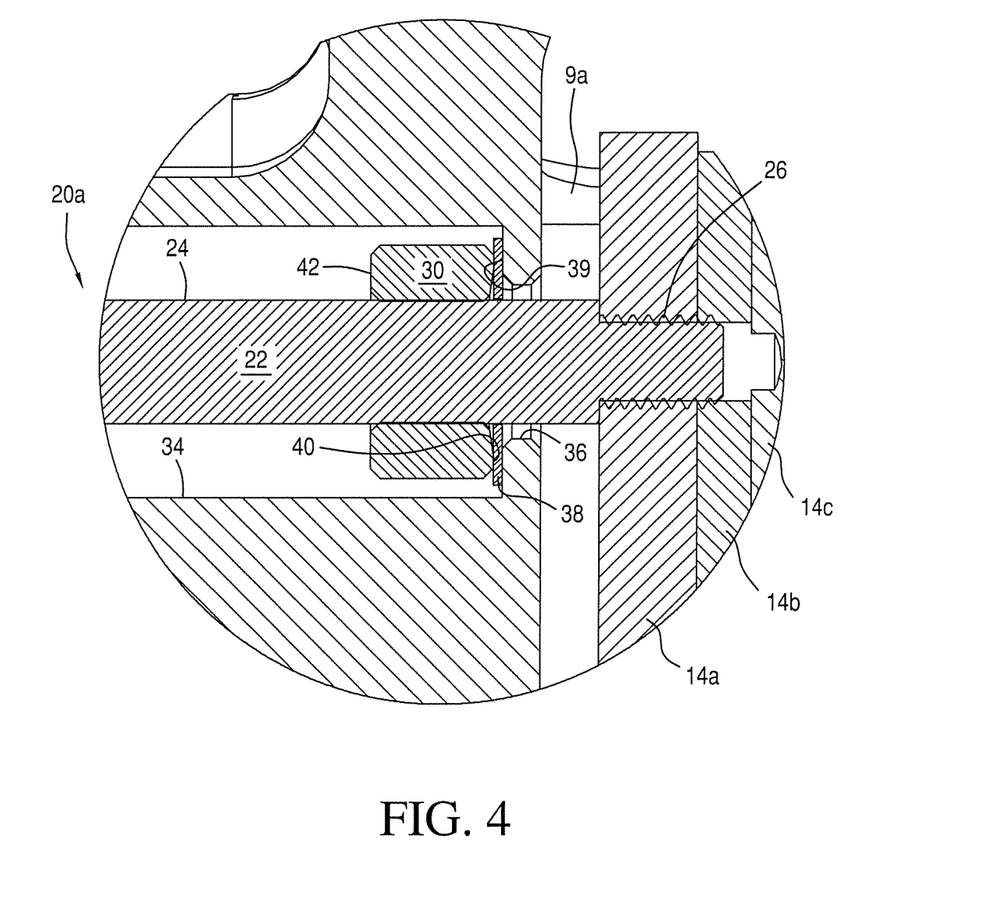
FIG. 4 is an enlargement of the of the circled area in FIG. 1B labeled "2A", illustrating the principal components of the brake pad timing and retraction controller of the invention in an actuated state with a worn brake pad, and how the split collar of the controller slidably adjusts its position on a bolt shaft to accommodate brake pad wear.

V=average speed
D=drag torque
Rt=rolling radius of tire
BSFC=brake specific fuel consumption Pr=fuel density
Avg Speed affects total drag, but with assumed constant BSFC it does not affect fuel usage Constant BSFC vs rpm takes final drive out of calculations
Fuel Waste is inversely proportional to tire diameter FIG. 4 illustrates the self-adjusting feature of the brake pad timing and retraction controller 20a, 20b and 20c, 20d. As previously mentioned, the frictional engagement between the collar 30 and the bolt shaft 24 is selected such that the collar 30 can completely compress the spring member 38 without sliding along the bolt shaft 24. However, when the brake pads 12a, 12b wear down to an extent that requires a greater piston stroke for the pad engagement surface 16 to frictionally engage the annular surfaces 18a, 18b of the rotor 5, the frictional engagement between the collar 30 and the bolt shaft 24 is insufficient to prevent the collar 30 from sliding on the shaft 24 in response to the extension force applied to the bolt shaft by its respective piston pair 9a, 9b or 9c, 9d. Consequently, the collar 30 will slide to the position necessary to flatten the spring member 38 into the position shown in FIG. 4 in order to engage the pad surface 16 against the rotor S as shown in the position illustrated in FIG. 3B.

Figure 5A:
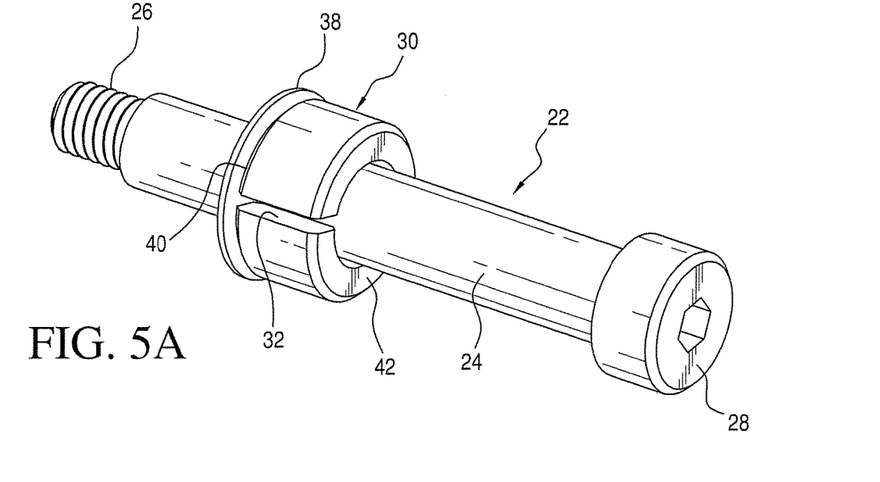
FIG. 5A is a perspective drawing of the bolt, split collar and Belleville spring of the brake pad timing and retraction controller of the invention.
Figure 5B:
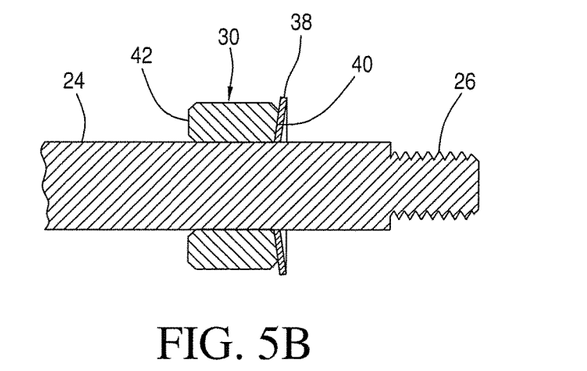
FIG. 5B is a partial cross sectional view of the bolt, split collar and Belleville spring illustrated in FIG. 5A, with the chamfered side of the split collar in engagement with the convex surface of the Belleville spring.
Figure 5C:
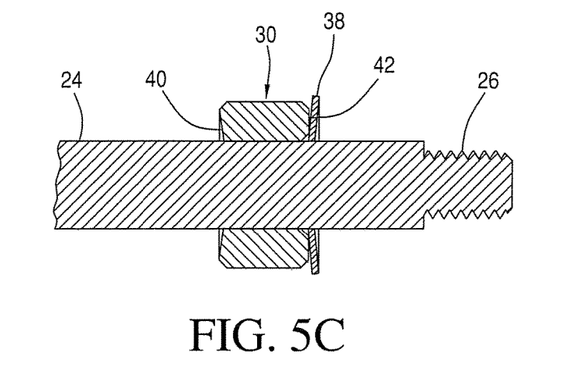
FIG. 5C is a partial cross sectional view of the bolt, split collar and Belleville spring illustrated in FIG. 5A, with the flat side of the split collar in engagement with the convex surface of the Belleville spring.

FIG. 5A-5C illustrate how the collar 30 of the brake pad timing and retraction controller 20a, 20b and 20c, 20d may advantageously be used to adjust the stroke length of the Belleville spring 38. The generally cylindrical shape of the collar 30 allows this component to be reversible when assembled over the shaft 24 of the bolt 22. Accordingly, either of the two opposing sides 40 or 42 may be used to engage the Belleville spring 38 when the collar 30 is press-fitted over the shaft 24 of the bolt 22. In this example of the invention, one of these surfaces 40 is provided with a chamfered, dish-shaped profile that is partially complementary in shape to the Belleville spring 38 in order to shorten the stroke length of the spring 38, while the other of these surfaces 42 has a flat profile to maximize the stroke length of the Belleville spring 38. Such a structure advantageously allows the stroke length of the Belleville springs 38 used in the brake pad timing and retraction controller 20a, 20b and 20c, 20d to be easily shortened or lengthened to accommodate the specific type of brake caliper that the invention is incorporated in. Of course, it would be possible to adjust the stroke length by using a stack of Belleville springs as the resilient member, and by adding or subtracting the number of springs in the stack. However, such a technique for adjusting stroke length does not allow relatively small adjustments to be made in the short preferred stroke lengths (i.e. between about 1.50 mm and 0.025 mm) of the invention. By contrast, the selective profiling of the spring-engaging surface of the collar 30 allows extremely small and precise adjustments to be made in embodiments of the brake pad timing and retraction controller where only a single Belleville spring is used.

Figure 6:
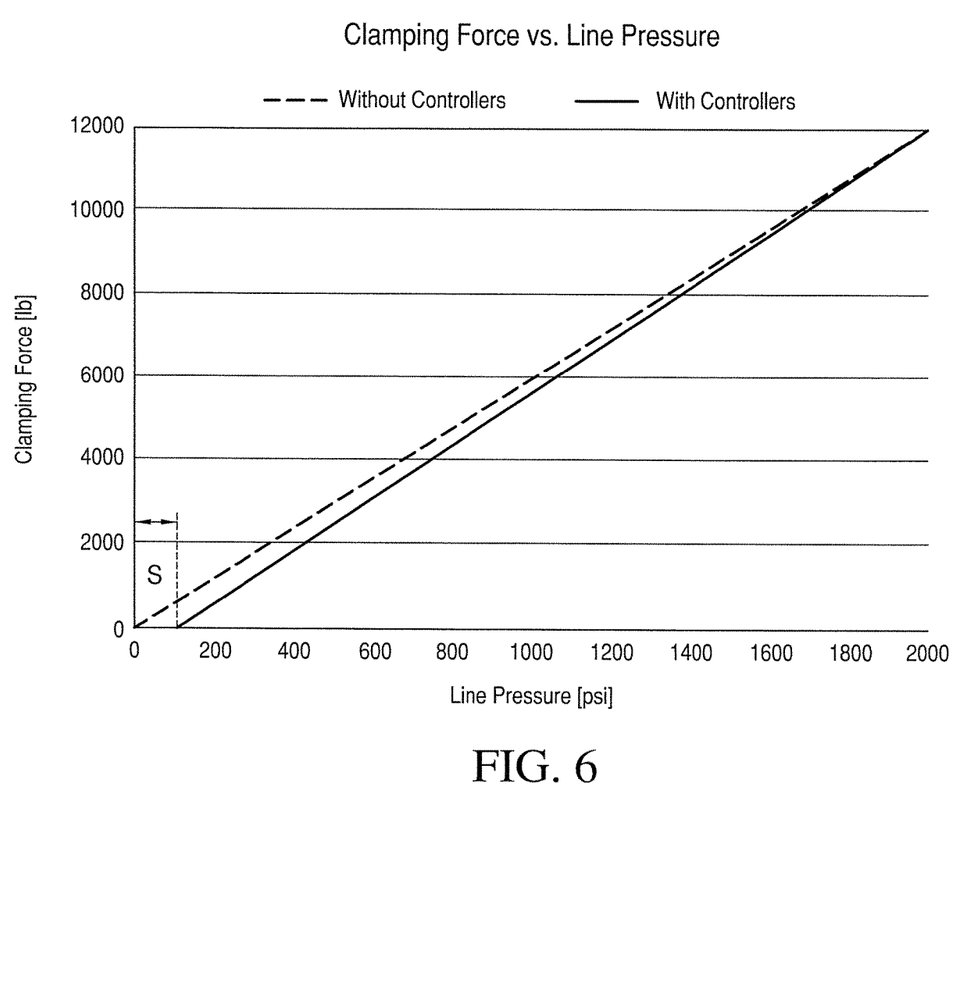
FIG. 6 is a graph illustrating how the clamping force of a brake caliper with the controller (solid line) is slightly delayed and reduced relative to the clamping force of a brake caliper without the controller (dashed line) as a function of hydraulic line pressure of the brake pad pistons.

The compression stroke of the spring 38 momentarily delays extension of the brake pads. This is indicated in the graph of FIG. 6, which illustrates how the clamping force of a brake caliper with controllers 20a, 20b and 20c, 20d (solid line) is slightly delayed and reduced relative to the clamping force of a brake caliper without the controllers of the invention (dashed line). Note how zero clamping force is initially generated between the brake pads 12a, 12b and the rotor S for the first 100 psi of hydraulic line pressure (indicated by the distance "S"), as the first 100 psi is used to overcome the stroke of the spring 38. Note further how the resulting clamping force indicated by the solid line lags slightly behind the clamping force generated by a caliper without controllers 20a, 20b and 20c, 20d as a result of the hold-off biasing force that the spring 38 applies against the extension force of the piston pairs 9a, 9b and 9c, 9d. As indicated previously, this slight reduction in clamping force in brake calipers incorporating the controllers of the invention is what advantageously allows the relative timing of different brakes of a vehicle to be adjusted to produce a desired timing bias between the brakes on different pairs of tires (i.e. rear vs. front, right vs. left). The exact and relative amounts of momentary delay and reduction in clamping force is of course dependent upon the relative stroke and spring force properties of the spring members 38 used in the controllers 20a, 20b and 20c, 20d as well as the exact and relative amounts of the piston extension forces.

Figure 7:
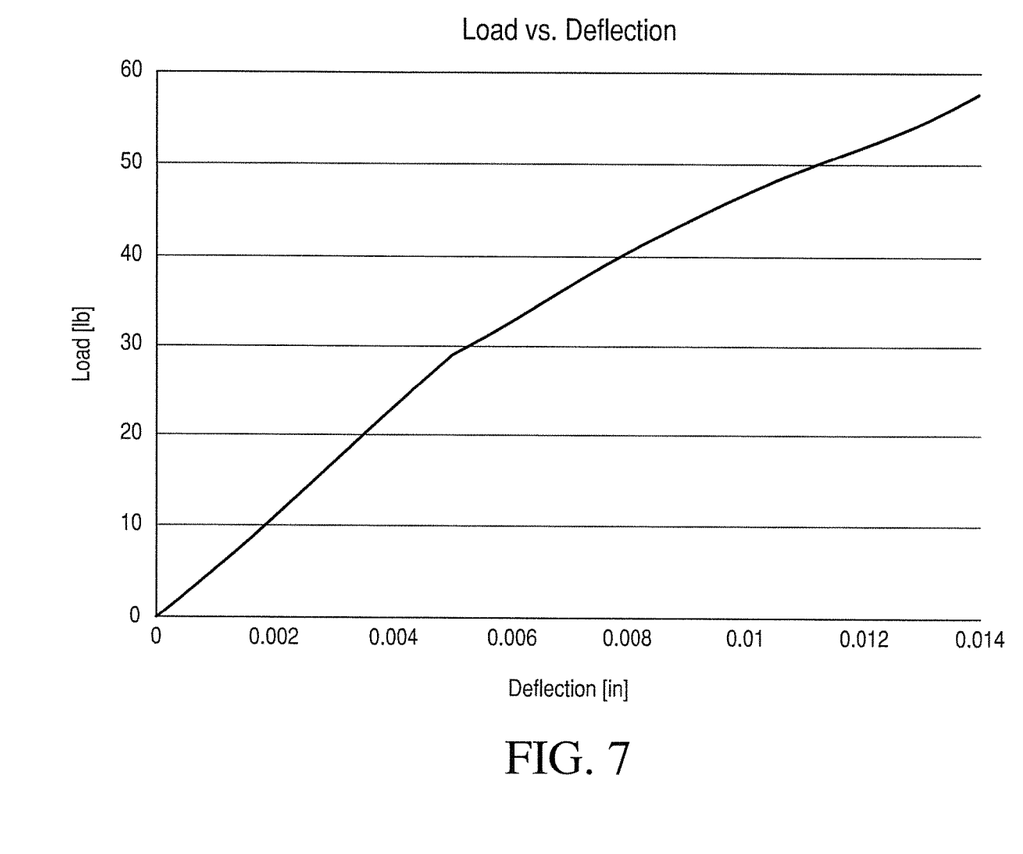
FIG. 7 is a graph illustrating the force/distance characteristics of the Belleville spring used in the exemplary embodiment of the invention.

The precise amounts of both the momentary delay and force reduction imposed on the piston stroke and forced "snap-back" of the brake pads 12a, 12b from the rotor 5 are dependent upon, and may be adjusted by, the specific stroke length and spring force properties of the spring member 38. FIG. 7 is a graph illustrating how the force of the Belleville spring 38 used in the example of the invention varies over its compression travel. FIG. 7 illustrates two important characteristics of the spring 38. First, the spring 38 is a relatively "stiff" spring, requiring approximately 4.7 lbs. of force for every 0.001 inches of compression. Such a high-force, short compression travel advantageously allows the controllers 20a, 20b and 20c, 20d to be used in combination with high performance brake systems without compromising the short brake pedal stroke desired in such systems. This same characteristic also allows the controllers 20a, 20b and 20c, 20d to be made compactly with a single Belleville spring 38, which is important in view of the limited space available in the brake caliper 3. Secondly, the substantial linearity of the force/distance property of the spring 38 results in a modified clamping force curve (see FIG. 6) that substantially tracks the unmodified clamping force curve with respect to the line pressure generated by the master cylinder of the brake system. Thus there is little or no perceptible difference in the "feel" of the brake pedal experienced by the vehicle operator between brakes modified by the controllers 20a, 20b and 20c, 20d and unmodified brakes.

The invention has been described in detail with particular reference to certain preferred embodiments thereof, but it will be understood that variations and modifications can be effected within the spirit and scope of the invention.

The invention claimed is:

1. A brake caliper, comprising:
   a caliper housing having first and second housing side portions adapted to be disposed on opposite sides of a brake rotor, each housing side portion including a caliper retraction bore, a bolt clearance hole that is narrower than the caliper retraction bore and an annular ledge of the housing side portion at an interface between the caliper retraction bore and the bolt clearance hole;
   first and second brake pads extendably and retractably mounted on the first and second housing side portions, respectively;
   a reacting member that extends and retracts each brake pad, and
   a brake pad timing and retraction controller disposed on each of the first and second side portions of the caliper housing and operative upon each of the first and second brake pads, comprising:
      a bolt and a connection between the bolt and the respective one the first and second brake pads, the bolt extending through both of the caliper retraction bore and the bolt clearance hole;
      a retraction collar positioned upon the bolt with a sliding fit and a frictional grip between the collar and the bolt, the retraction collar slidingly received along the caliper retraction bore of the housing side portion; and
      a short stroke spring operatively captured between the retraction collar and the annular ledge portion of the housing, the spring having a diameter less than a diameter of the caliper retraction bore, the spring diameter being greater than a diameter of the bolt clearance hole, the sliding fit being sufficient to cause compression of the spring against the annular ledge of the respective housing side portion by a predetermined compression travel distance upon extension of the first and second brake pads by operation of the respective reacting member, the sliding fit being such that further extension of the first and second brake pads causes the retraction collar to slide along the bolt;
   wherein the frictional grip between the collar and the bolt is greater than the amount of force necessary to maximally compress the short stroke spring,
   wherein said controller applies an adjustable hold-off force against an extension force applied to said brake pad by said reacting member that momentarily delays extension until the spring is fully compressed between the retraction collar and annular ledge and slightly reduces a clamping force between said brake pad and said rotor, and
   whereby upon release of the reacting member, the spring releases against the annular ledge of the respective housing portion and the retraction collar to positively and consistently retract the brake pad by the predetermined compression travel distance.

2. The brake caliper defined in claim 1, wherein the predetermined compression travel of the spring is between about 1.50 mm and 0.025 mm.

3. The brake caliper defined in claim 1, wherein the controllers positively retract the brake pad from the rotor a consistent distance throughout a wear life of the brake pad and the rotor.

4. The brake caliper defined in claim 1, wherein the controllers are directly connected to said first and second brake pads, the annular ledge being disposed between brake pad and the spring, the spring being located between the retraction collar and the annular ledge.

5. The brake caliper defined in claim 4, wherein the direct connection of each of said brake pad timing and retraction controllers with its respective brake pad is a threaded connection.

6. The brake caliper defined in claim 5, wherein the caliper retraction collar is frictionally engaged but slidably movable on the bolt, and the caliper retraction bore is slightly larger than said caliper retraction collar for slidably receiving the same.

7. The brake caliper defined in claim 6, wherein the spring includes a Belleville spring disposed between the caliper retraction collar and an end surface of said caliper retraction bore.

8. The brake caliper defined in claim 7, wherein an outer periphery of said Belleville spring extends beyond an outer periphery of said caliper retraction collar.

9. The brake caliper defined in claim 7, wherein an engaging surface of said caliper retraction collar is at least partially complementary in said shape to said Belleville spring in an uncompressed state to reduce the compression travel of the Belleville spring.

10. The brake caliper defined in claim 7, wherein said caliper retraction collar includes a second engaging surface different in shape from the first engaging surface that provides a different compression travel of the Belleville spring.

11. The brake caliper defined in claim 6, wherein the spring is disposed between said caliper retraction collar and the annular ledge of the housing side portion, and wherein said frictional engagement between said collar and the bolt is sufficient to prevent said collar from sliding on the bolt in response to a spring force of the spring when the spring is completely compressed.

12. The brake caliper defined in claim 11, wherein said frictional engagement between the caliper retraction collar and the bolt is insufficient to prevent the caliper retraction collar from sliding on the bolt in response to an extension force applied to an end of the bolt by said reacting member.

13. The brake caliper defined in claim 1, wherein a pair of said brake pad timing and retraction controllers is disposed on each of the first and second housing side portions, and wherein each pair of brake pad timing and retraction controllers is disposed substantially symmetrically with respect to a centroid of a resultant extension force applied to its respective brake pad by said reacting member.

14. The brake caliper defined in claim 13, wherein said brake pad timing and retraction controllers are arranged in a pattern that substantially overcomes moment forces applied to its respective braking pad such that a braking surface of each of said brake pads engages the rotor uniformly upon extension of said brake pads by said reacting members.

15. The brake caliper defined in claim 1, wherein each of said brake pad timing and retraction controllers further includes a compression travel limiter that is at least partially complementary in shape to the spring and that limits the compression travel of the spring.

16. The brake caliper defined in claim 15, wherein an outer periphery of the spring extends beyond an outer periphery of said compression travel limiters.

17. The brake caliper defined in claim 1, in combination with at least some of the brakes of a vehicle having a plurality of brakes to provide a brake bias to the vehicle as a result of said calipers having said brake pad timing and retraction controllers.

18. The brake caliper defined in claim 1, in combination with only the rear brakes of a vehicle having front and rear brakes to provide a front brake bias to the vehicle as a result of the rear brakes having said brake pad timing and retraction controllers.

19. The brake caliper defined in claim 1, wherein the compression distance of the spring is between about 0.60 mm and 0.05 mm.

20. The brake caliper defined in claim 1, wherein the spring includes a plurality of Belleville springs, wherein said spring force is adjusted by selecting the number of Belleville springs of the plurality.

21. The brake caliper defined in claim 1, wherein said reacting member includes a hydraulic piston.

22. The brake caliper defined in claim 1, in combination with one of a truck.

23. The brake caliper defined in claim 1, in combination with one of a military vehicle.

24. The brake caliper defined in claim 1, in combination with an automotive vehicle.

25. The brake caliper defined in claim 1, wherein there is a difference in the spring force of the spring of said brake pad timing and retraction controllers for said first and second brake pads allowing one pad to engage the rotor with more force than the other to control a thermal input on one side of the rotor or the other.

26. The brake caliper defined in claim 1, wherein the spring of the brake pad timing and retraction controllers is positioned at a point in the brake pad that dampens vibration noises.

27. The brake caliper defined in claim 1, wherein each of said brake pad timing and retraction controllers is located at or near a point of maximum displacement of vibration on the brake pad.

28. The brake caliper defined in claim 1, wherein the bolt is free of direct contact the caliper housing.

29. The brake caliper defined in claim 1, wherein the bolt includes a bolt head adjacent an open end portion of the caliper retraction bore.

\* \* \* \* \*